Feb. 23, 1943.  D. W. SHERMAN  2,311,880
AUTOMOBILE FRAME
Filed Nov. 12, 1940
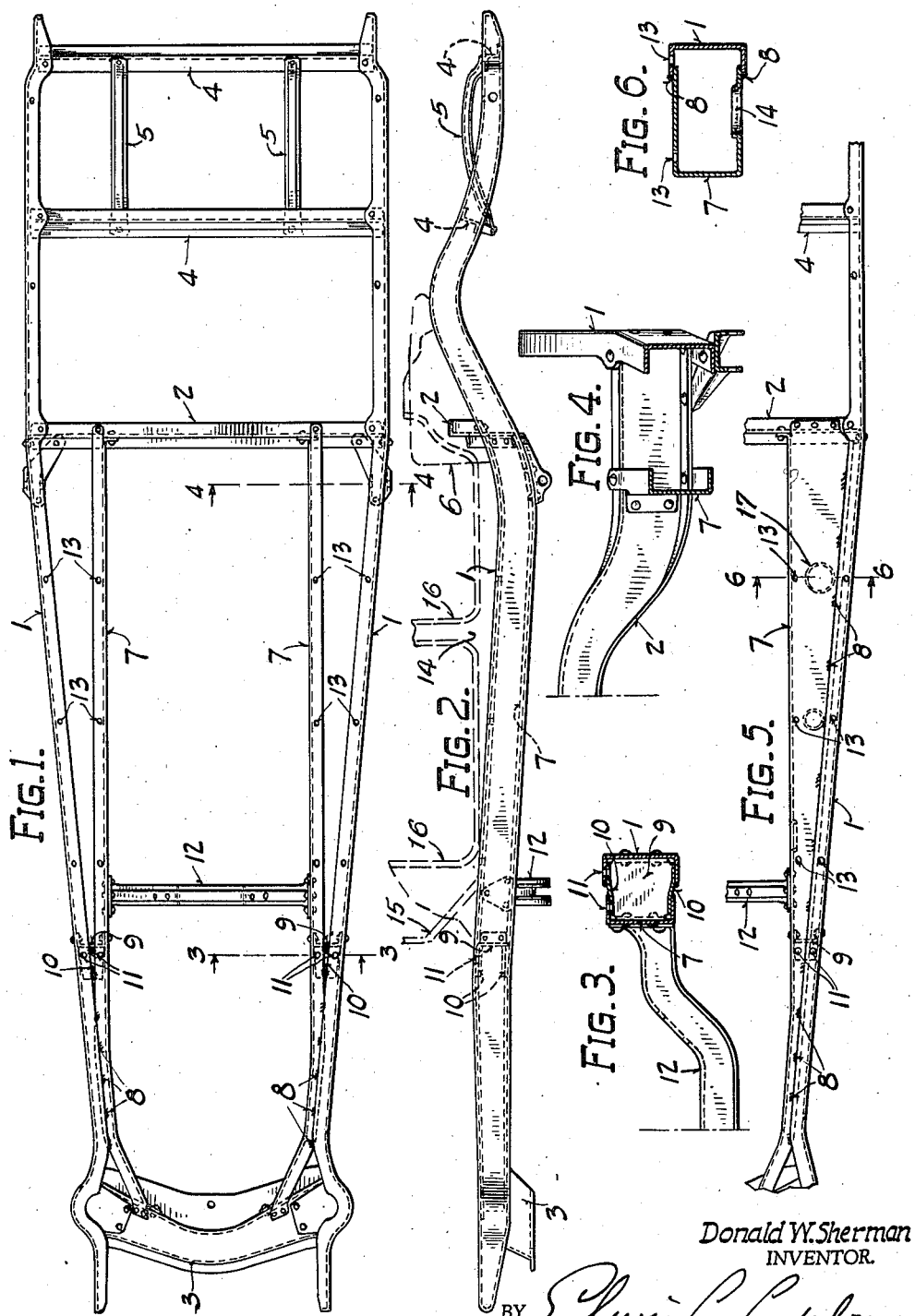
Donald W. Sherman
INVENTOR.
BY
ATTORNEY.

Patented Feb. 23, 1943

2,311,880

UNITED STATES PATENT OFFICE 2,311,880

AUTOMOBILE FRAME

Donald W. Sherman, Shorewood, Wis., assignor to A. O. Smith Corporation, Milwaukee, Wis., a corporation of New York Application November 12, 1940, Serial No. 365,231

5 Claims. (Cl. 280—106)

This invention relates to an automobile frame.

An object of the invention is to provide a lighter and cheaper automobile frame than those now in use.

A further object of the invention is to provide a frame to cooperate with the body in forming a rigid structure, the frame being rigid where the body is deficient in rigidity and of lesser weight and rigidity where the body is amply rigid.

These and other objects of the invention will be clear from the following detailed description and the drawing in which:

Figure 1 is a plan view of a frame for a closed car;

Fig. 2 is a side elevation of the frame;

Fig. 3 is a section on line 3—3 of Fig. 1 looking from left to right;

Fig. 4 is a section on line 4—4 of Fig. 1;

Fig. 5 is a plan view of a part of a frame showing an embodiment of the invention particularly adapted for use in open cars; and Fig. 6 is a section on line 6—6 of Fig. 5.

That part of a closed car body which is to the rear of the rear door opening is rigid torsionally, laterally, and vertically. Even a heavy frame adds but little to the rigidity of this section of the body. Forward from the rear of the rear door opening the body is rigid laterally, fair as a torsion member, but because of the door openings, only poor as a beam to carry vertical loads. In a frame with but two longitudinal members, these members, the side rails, must be of varying depth to adequately meet the strength and rigidity requirements at different sections, or, if made of substantially uniform depth, are of greater rigidity and weight than are needed at some sections. In one case, a considerable loss in scrap is involved in the manufacture of the side rails, in the other, the frame is unnecessarily heavy and costly.

In the frame of the present invention, the side rails are of lighter weight and lesser depth than would be necessary if they were the only longitudinal members, and are reenforced by auxiliary longitudinal members which extend only over that part of the length where additional strength and rigidity are needed.

Referring to the drawings, the side rails 1, which are preferably of channel section with inwardly turned flanges, are substantially parallel from the rear of the frame to cross member 2, from which they converge in substantially straight lines towards the front cross member 3. At the rear of the frame the side rails are connected by a pair of suitable cross members 4 which also carry gas tank straps 5 for the support of the gas tank.

The cross member 2 is located at the front of the rear seat 6 and just beneath it, to the rear of the rear car doors. The member 2 at its center rises above the side rails to provide room for the propellor shaft. To the rear of this member the frame is connected to the rigid section of the body. In front of this member the frame is strengthened and stiffened by auxiliary longitudinal members 7 extending from the cross member 2 to the forward cross member 3. These longitudinal members are preferably of channel sections with outwardly turned flanges which are riveted or welded at the front end of the frame to the inwardly turned flanges of the side rails 1. Either riveting or welding provides a satisfactory joint between the flanges but when rivets are used it is necessary to leave holes in the web of either the side rails or the auxiliary longitudinal members in order that the rivets can be set. These holes somewhat decrease the strength and rigidity of the box section formed by union of the longitudinal members. For this reason it is preferred to unite the flanges by welds 8 since the welds can be made without the necessity for any holes in the longitudinal members.

The box sections formed by welding the longitudinal members together are closed at the rear where these members diverge by shear plates 9. Each shear plate is riveted to both the side rail 1 and auxiliary longitudinal member 7 to increase the torsional rigidity of the box sections. Each shear plate is desirably provided with bent over flanges 10 extending into the box section. Bolt holes 11 are provided for attachment of the vertical body dash to the side rail, the auxiliary longitudinal member 7, and the upper flange of the shear plate 9.

A cross member 12 is provided between the auxiliary longitudinal members 7 to increase the rigidity of the frame and form a rear support for the motor mounting.

Bolt holes 13 are provided for the attachment of the body 14 to both the side rails and the auxiliary longitudinal members 7. With the body bolted in place a very strong and rigid structure is obtained with box section side frame members from the dash 15 to the forward cross member of the frame. From the dash to the rear of the door openings 16 in the body there are four longitudinal members in the frame, all fastened to the body structure to increase its vertical rigidity. From the rear of the door openings in the body, the body section is itself amply rigid and but two longitudinal frame members are employed. Frame and body are advantageously employed to produce a strong and rigid composite structure.

For open car construction in which the body is less rigid than a closed body, the frame can be further strengthened by the modification shown in Figs. 5 and 6. In this embodiment of the invention the flanges of the auxiliary members 7 are made wide enough to form a closed box section extending all the way from the front cross member 3 to cross member 2. Flanged holes 17 may be formed in the wide flanges to decrease the weight of the frame.

The invention is claimed as follows:

1. In a passenger automobile, a frame comprising a pair of non-parallel, spaced side rails diverging from the forward end toward the rear and having a rear kick-up to accommodate the rear axle, a front cross bar connecting the side rails, a cross bar connecting said side rails at the forward side of the rear kick-up, said side rails extending substantially parallel to each other rearwardly from said second named cross bar, and a pair of auxiliary longitudinal members extending from said front cross bar along said side rails for a short distance and thence parallel to each other to said second cross bar to provide a rigid frame for cooperating with the body of the automobile in regions where the body is weakened by door openings and the like.

2. In a passenger automobile, a frame comprising a pair of non-parallel, spaced side rails diverging from the forward end toward the rear for the major portion of their length and having a rear kick-up to accommodate the rear axle, a front cross bar connecting the side rails, a cross bar connecting said side rails at the forward side of the rear kick-up, and a pair of auxiliary longitudinal members extending from said front cross bar along said side rails for a short distance and thence parallel to each other to said second cross bar to provide a rigid frame for cooperating with the body of the automobile in regions where the body is weakened by door openings and the like, said side rails and auxiliary members providing box side members in the region of the location of the engine.

3. In a passenger automobile, a frame comprising a pair of non-parallel, spaced side rails diverging from the forward end toward the rear for the major portion of their length and having a rear kick-up to accommodate the rear axle, a front cross bar connecting the side rails, a cross bar connecting said side rails at the forward side of the rear kick-up, and a pair of auxiliary longitudinal members extending from said front cross bar along said side rails for a short distance and thence parallel to each other to said second cross bar to provide a rigid frame for cooperating with the body of the automobile in regions where the body is weakened by door openings and the like, said side rails and auxiliary members being of channel construction with their respective flanges connected together to provide box side members for substantially the full length between the two cross bars.

4. In a passenger automobile, a frame comprising a pair of spaced channel side rails diverging from the forward end toward the rear and formed to receive the rear axle, a front cross bar connecting the side rails, a second cross bar connecting said side rails at a location just forward of the location for the rear axle, and a pair of auxiliary longitudinal members extending from said front cross bar to said second cross bar substantially parallel to the longitudinal center line of the frame to provide long triangularly shaped structural side members extending for the greater part of the length of the frame for greater rigidity of the frame.

5. A frame for passenger automobiles, comprising a pair of spaced channel side rails diverging from the forward end toward the rear for the major portion of their length and having their flanges turned inwardly, a front cross bar connecting the side rails, a second cross bar near the rear end of the frame, a pair of auxiliary channel members having their respective ends secured to said cross bars and having their vertical webs extending substantially parallel to the longitudinal center line of the frame and their flanges facing the flanges of the respective side rails, and means securing the flanges of each auxiliary member to the respective flanges of the respective side rail adjacent thereto to provide a substantially closed box section side member of varying cross section for a substantial length of the frame.

DONALD W. SHERMAN.